(12) United States Patent
Steul et al.

(10) Patent No.: US 9,119,054 B2
(45) Date of Patent: Aug. 25, 2015

(54) COMMUNICATION SYSTEMS AND METHODS

(75) Inventors: Donald R. Steul, Burlingame, CA (US); Henry M. Vogel, Saratoga, CA (US); Brian J. Chisholn, Studio City, CA (US); Kavinder S. Dhaliwal, Fremont, CA (US); Yongjiang Zhang, Mountainview, CA (US); Ravichandran Rajamiyer, San Jose, CA (US); Jeffrey T. Becker, Los Gatos, CA (US); Aleksandar Dukic, Sunnyvale, CA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 293 days.

(21) Appl. No.: 13/416,821

(22) Filed: Mar. 9, 2012

(65) Prior Publication Data

US 2012/0232978 A1 Sep. 13, 2012

Related U.S. Application Data

(60) Provisional application No. 61/451,067, filed on Mar. 9, 2011, provisional application No. 61/517,910, filed on Apr. 26, 2011.

(51) Int. Cl.
| | |
|---|---|
| *H04M 3/00* | (2006.01) |
| *H04W 4/20* | (2009.01) |
| *H04W 4/00* | (2009.01) |
| *H04W 88/02* | (2009.01) |
| *H04W 4/02* | (2009.01) |

(52) U.S. Cl.
CPC .............. *H04W 4/206* (2013.01); *H04W 4/001* (2013.01); *H04W 4/003* (2013.01); *H04W 4/028* (2013.01); *H04W 88/02* (2013.01)

(58) Field of Classification Search
CPC ....... G06Q 20/20; H04W 12/06; H04W 4/08; H04W 76/02; H04W 48/18; H04W 4/00; H04W 88/02; H04W 4/001
USPC ...................... 455/412.1, 418, 419, 420, 566; 709/203, 217
See application file for complete search history.

(56) References Cited

U.S. PATENT DOCUMENTS

| | | | |
|---|---|---|---|
| 7,584,225 B2 * | 9/2009 | Jiang et al. ........................ 1/1 |
| 8,180,386 B1 * | 5/2012 | Delker et al. .................. 455/518 |
| 8,316,052 B2 * | 11/2012 | Hao et al. ....................... 707/783 |
| 8,626,133 B2 * | 1/2014 | Kuhlke et al. ............... 455/414.1 |
| 2005/0144219 A1 * | 6/2005 | Terada ............................ 709/203 |
| 2007/0281716 A1 * | 12/2007 | Altman et al. ................ 455/466 |
| 2008/0140664 A1 * | 6/2008 | Hao et al. .......................... 707/9 |
| 2008/0209329 A1 * | 8/2008 | DeFranco et al. ............. 715/733 |
| 2008/0318553 A1 * | 12/2008 | Wong .......................... 455/412.2 |
| 2009/0013048 A1 * | 1/2009 | Partaker et al. ................ 709/206 |
| 2009/0049125 A1 * | 2/2009 | Channabasavaiah .......... 709/204 |
| 2010/0093313 A1 * | 4/2010 | Keihag ........................ 455/412.1 |
| 2010/0150322 A1 * | 6/2010 | Yin et al. .................... 379/88.14 |
| 2010/0257593 A1 * | 10/2010 | Avelo et al. ....................... 726/4 |

(Continued)

*Primary Examiner* — Olumide T Ajibade Akonai
(74) *Attorney, Agent, or Firm* — DLA Piper LLP (US)

(57) ABSTRACT

Communication systems and methods support communication between multiple devices. In some embodiments, a method initiates a communication session between a first device and a second device via a server. The method identifies a first user associated with the first device and identifies a second user associated with the second device. An interaction history between the first user and the second user is accessed from the server and communicated to the first device for display on the first device.

18 Claims, 17 Drawing Sheets

(56) References Cited

U.S. PATENT DOCUMENTS

2011/0258327 A1* 10/2011 Phan et al. .................... 709/227
2011/0258329 A1* 10/2011 Lee et al. ..................... 709/227
2012/0197740 A1* 8/2012 Grigg et al. ..................... 705/16
2013/0007159 A1* 1/2013 Provo ........................... 709/206
2013/0017843 A1* 1/2013 Jennings et al. ........... 455/456.2

* cited by examiner

COMMUNICATION SYSTEMS AND METHODS

RELATED APPLICATION

This application claims the benefit of United States Provisional Application Ser. No. 61/451,067, entitled "COMMUNICATION SYSTEMS AND METHODS", filed Mar. 9, 2011, the disclosure of which is incorporated herein by reference in its entirety.

TECHNICAL FIELD

The present disclosure generally relates to data processing techniques and, more specifically, to communication systems and methods.

BACKGROUND

Advancements in computer and mobile device technology have created mobile devices with increased functionality. However, these enhanced mobile devices typically use a conventional dialer application when placing calls. The same dialer applications have been used for many years and fail to take advantage of the new functions available in the enhanced mobile devices.

BRIEF DESCRIPTION OF THE DRAWINGS

Some embodiments are illustrated by way of example and not limitation in the figures of the accompanying drawings.

DETAILED DESCRIPTION

The systems and methods described herein allow users to communicate with one another using, for example, mobile devices. Users may communicate via a data channel and/or a voice channel. In certain situations, two users may communicate via a data channel and a voice channel simultaneously. The described systems and methods allow users to assign a priority to, and associate other data with, a voice call, thereby allowing the voice call recipient to understand the nature of the call prior to answering the call. Additionally, the systems and methods described herein allow merchants to automatically provide offers, forms, and other merchant-related information to customers during business and non-business hours.

In particular embodiments, a "user" is also referred to as a "caller", an "initiator" or a "recipient". Specific examples discussed herein relate to communications between two users, each communicating via a mobile device such as a cellular phone, smart phone, and the like. However, the systems and methods discussed herein can be used with any type of device capable of performing the described procedures and operations.

Figure 1:
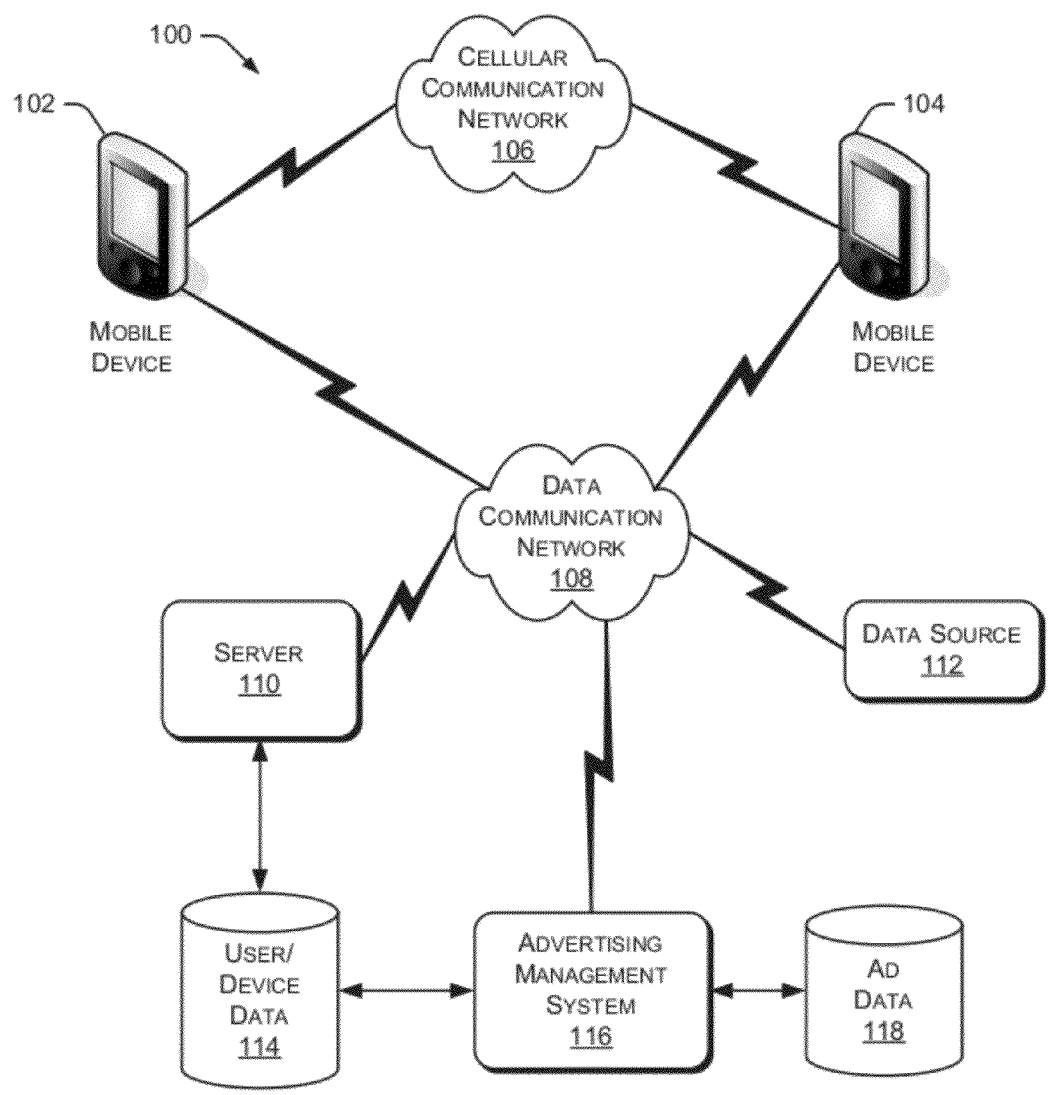
FIG. 1 illustrates an example environment in which the systems and methods discussed herein can be applied.

FIG. 1 illustrates an example environment 100 in which the systems and methods discussed herein can be applied. Environment 100 illustrates two mobile devices 102 and 104 capable of communicating via a cellular communication network 106 and/or a data communication network 108. Cellular communication network 106 may utilize any communication protocol and any number of components, systems and communication links. Data communication network 108 may utilize any communication protocol and any type of communication medium. In one embodiment, data communication network 108 is the Internet. In other embodiments, data communication network 108 is a combination of two or more networks coupled to one another.

A server 110 is coupled to data communication network 108 and capable of communicating with mobile devices 102 and 104. Server 110 is capable of performing various communication-related functions as described herein. Server 110 communicates with various data sources and data storage devices to obtain information, such as data source 112 and user/device data 114. Example information includes user profile data, user configuration settings, interaction histories between various users, and the like.

An advertising management system 116 is coupled to data communication network 108, user/device data 114, and an advertisement database 118. Advertising management system 116 performs various advertisement-related functions, such as creating and editing advertisements, selection and ranking of advertisements based on various factors, and communicating advertisements to server 110 and/or mobile devices 102 and 104. Advertisement database 118 contains various advertisements and information associated with those advertisements. Advertisement database 112 may also contain campaign history data used for reporting, generating new advertising campaigns, and so forth. Additional details regarding the communication of advertisements are provided below.

Figure 2:
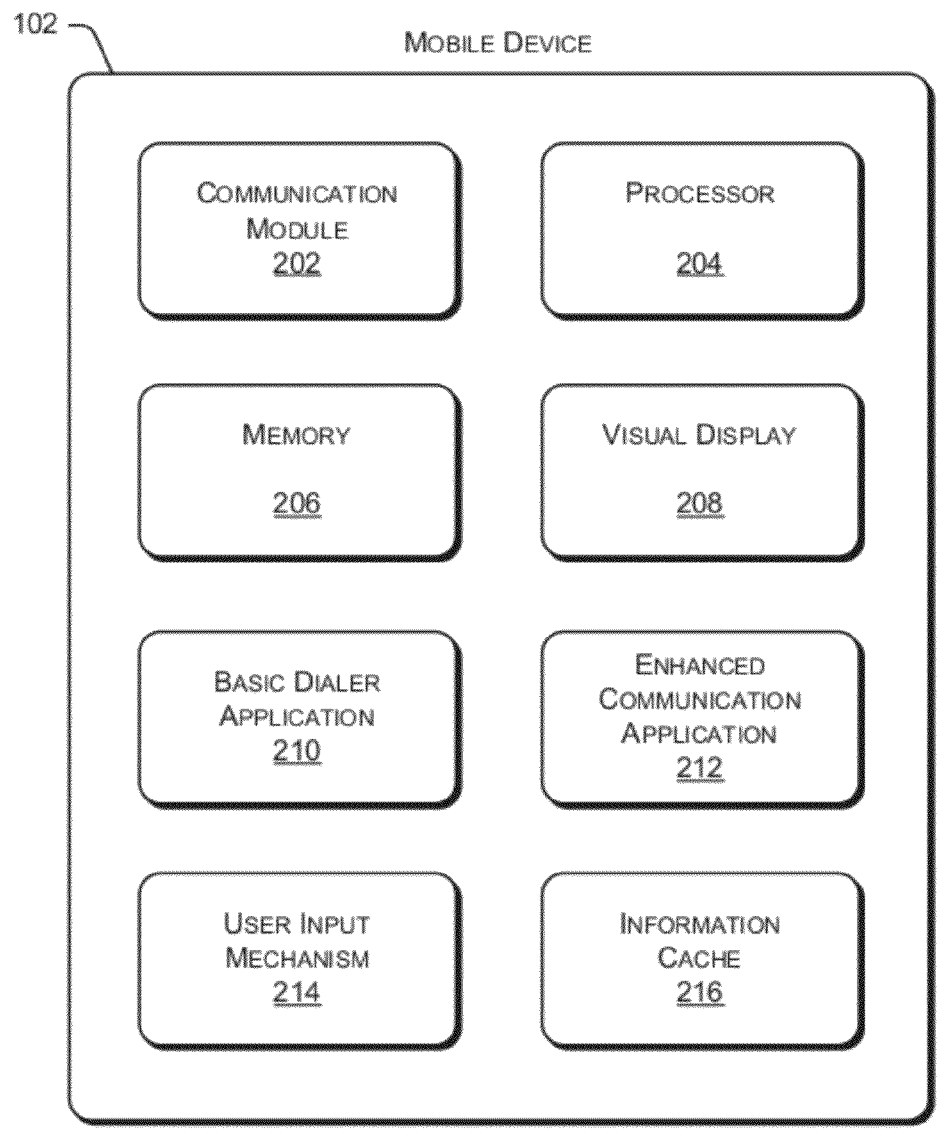
FIG. 2 is a block diagram illustrating various components of an example mobile device.

FIG. 2 is a block diagram illustrating various components of example mobile device 102. Mobile device 102 includes a communication module 202, a processor 204, and a memory

206. Communication module 202 allows mobile device 102 to communicate with other devices, such as communication networks, other mobile devices, computer systems, and so on. Processor 204 executes various instructions to implement the functionality provided by mobile device 102. Memory 206 stores these instructions as well as other data used by processor 204 and other modules contained in mobile device 102.

Mobile device 102 also includes a visual display 208 that presents information to a user of the mobile device. In certain embodiments, visual display 208 is a touch screen that is capable of displaying information as well as receiving input from the device user. Mobile device 102 has a basic dialer application 210 as well as an enhanced communication application 212. In a particular embodiment, basic dialer application 210 is provided by the manufacturer of the device and includes basic voice call functions, such as initiating a voice call and searching for phone numbers in a contact list. Enhanced communication application 212 provides additional features not contained in basic dialer application 210. For example, enhanced communication application 212 may support communication between mobile device 102 and another mobile device having a similar enhanced communication application. The additional features may include simultaneous data communication via a data channel and voice communication via a voice channel. The additional features also include associating a call priority or other information with a voice call and communicating that priority or information to a call recipient. Other features supported by enhanced communication application 212 are discussed herein.

Mobile device 102 also includes a user input mechanism 214, such as buttons, switches, touch pads, touch screens and the like. User input mechanism 214 may also receive voice commands or any other input/command from a user of mobile device 102. Mobile device 102 stores various communication-related information in an information cache 216, such as display pages associated with other mobile devices, interaction histories with other mobile device users, configuration settings, and the like. In an alternate embodiment, information cache 216 is integrated with memory 206.

Figure 3:
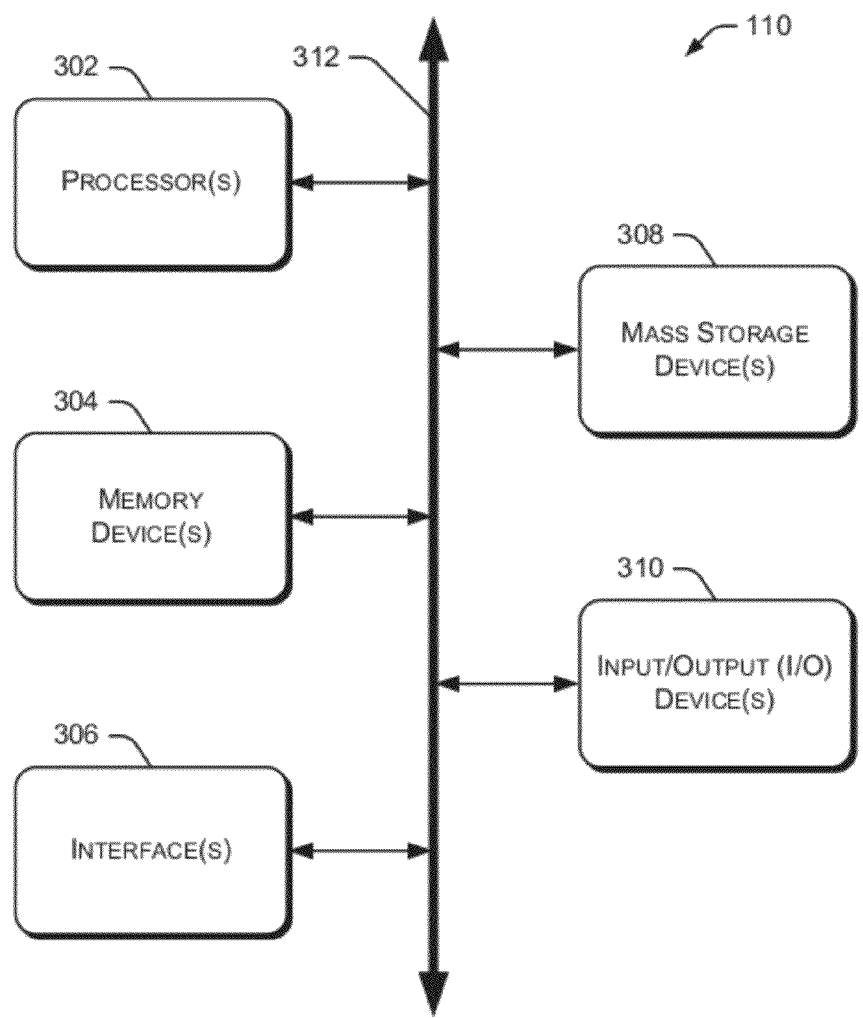
FIG. 3 is a block diagram illustrating various components of an example server.

FIG. 3 is a block diagram illustrating various components of example server 110. Server 110 may be used to perform various procedures, such as those discussed herein. The components shown in FIG. 3 can function as a server, as described herein, or any other computing entity. Server 110 can be any of a wide variety of computing devices, such as a desktop computer, a notebook computer, a server computer, a handheld computer, and the like.

Server 110 includes one or more processor(s) 302, one or more memory device(s) 304, one or more interface(s) 306, one or more mass storage device(s) 308, and one or more Input/Output (I/O) device(s) 310, all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM)) and/or nonvolatile memory (e.g., read-only memory (ROM)). Memory device(s) 304 may also include rewritable ROM, such as Flash memory.

Mass storage device(s) 308 include various computer readable media, such as magnetic tapes, magnetic disks, optical disks, solid state memory (e.g., Flash memory), and so forth. Various drives may also be included in mass storage device(s) 308 to enable reading from and/or writing to the various computer readable media. Mass storage device(s) 308 include removable media and/or non-removable media.

I/O device(s) 310 include various devices that allow data and/or other information to be input to or retrieved from server 110. Example I/O device(s) 310 include cursor control devices, keyboards, keypads, microphones, monitors or other display devices, speakers, printers, network interface cards, modems, lenses, charge-coupled devices (CCDs) or other image capture devices, and the like.

Interface(s) 306 include various interfaces that allow server 110 to interact with other systems, devices, or computing environments. Example interface(s) 306 include any number of different network interfaces, such as interfaces to local area networks (LANs), wide area networks (WANs), wireless networks, and the Internet.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, Peripheral Component Interconnect (PCI) bus, IEEE 1394 bus, Universal Serial Bus (USB), and so forth.

For purposes of illustration, programs and other executable program components are shown herein as discrete blocks, although it is understood that such programs and components may reside at various times in different storage components of server 110, and are executed by processor(s) 302. Alternatively, the systems and procedures described herein can be implemented in hardware, or a combination of hardware, software, and/or firmware. For example, one or more application-specific integrated circuits (ASICs) can be programmed to carry out one or more of the systems and procedures described herein.

Figure 4:
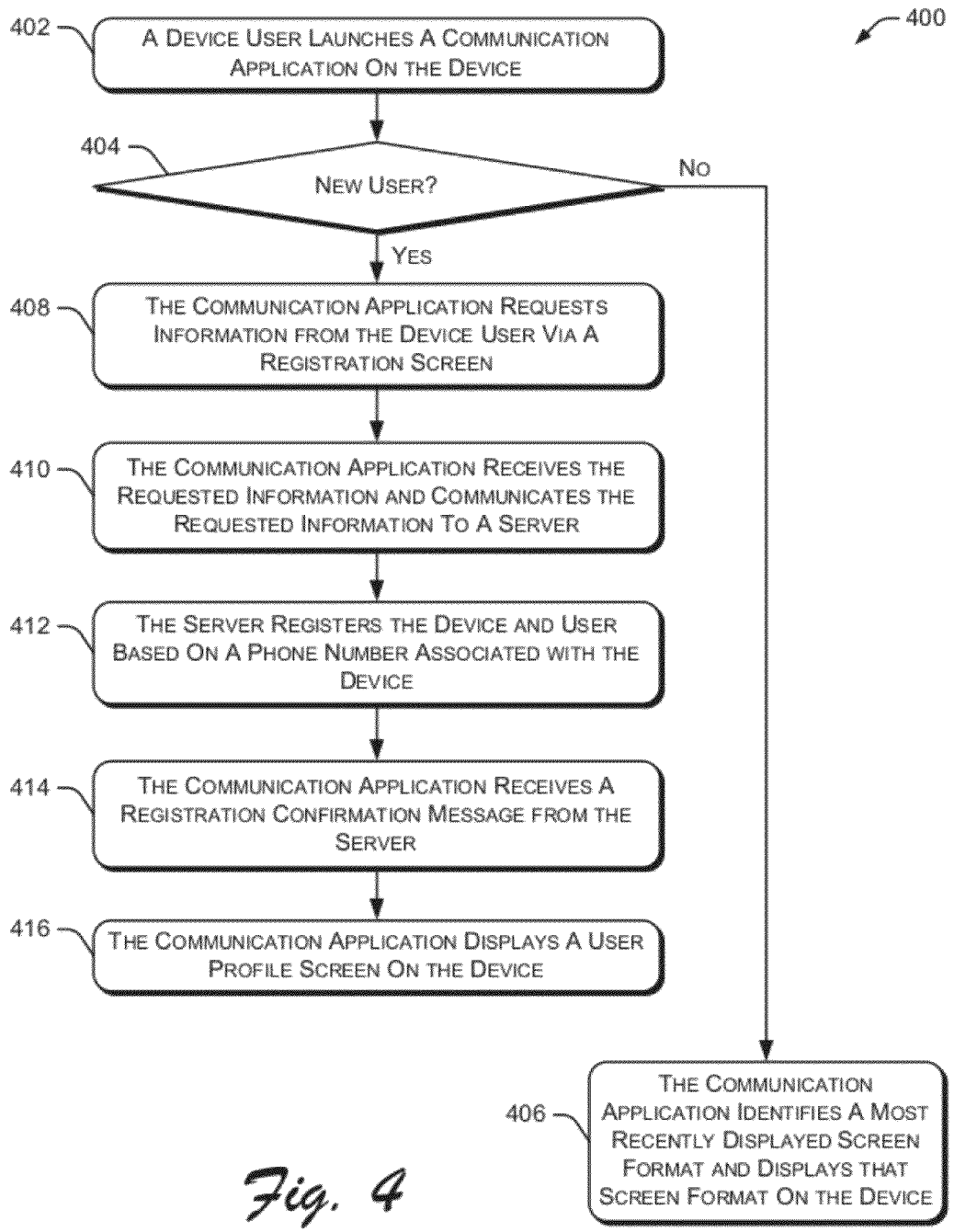
FIG. 4 is a flow diagram illustrating an embodiment of a procedure for launching a communication application.

FIG. 4 is a flow diagram illustrating an embodiment of a procedure 400 for launching a communication application. Initially, a device user launches a communication application on the device at 402, such as enhanced communication application 212 discussed above with respect to FIG. 2. If this is not the first time the user has launched the communication application (i.e., not a new user) at 404, the communication application identifies a most recently displayed screen format (e.g., the display format when the user last terminated the application) at 406. That screen format is used as the starting screen format during the next launch of the communication application. In an alternate embodiment, the communication application displays the last contact with which the user communicated as well as an interaction history associated with that last contact.

If this is the first time the user has launched the communication application (i.e., a new user), the communication application requests information from the device user via a registration screen at 408. This information may include the user's name, phone number, email address, mailing address, display preferences, communication preferences, and so forth. The communication application receives the requested information and communicates the requested information to a server, such as server 110 discussed above with respect to FIG. 1, at 410. The server registers the device and the user based on a phone number associated with the device at 412. After the server completes registration of the user, it sends a registration confirmation message to the communication application executing on the device. Upon receipt of this registration confirmation message at 414, the communication application displays a user profile screen (or other display page) on the device at 416.

Figure 5:
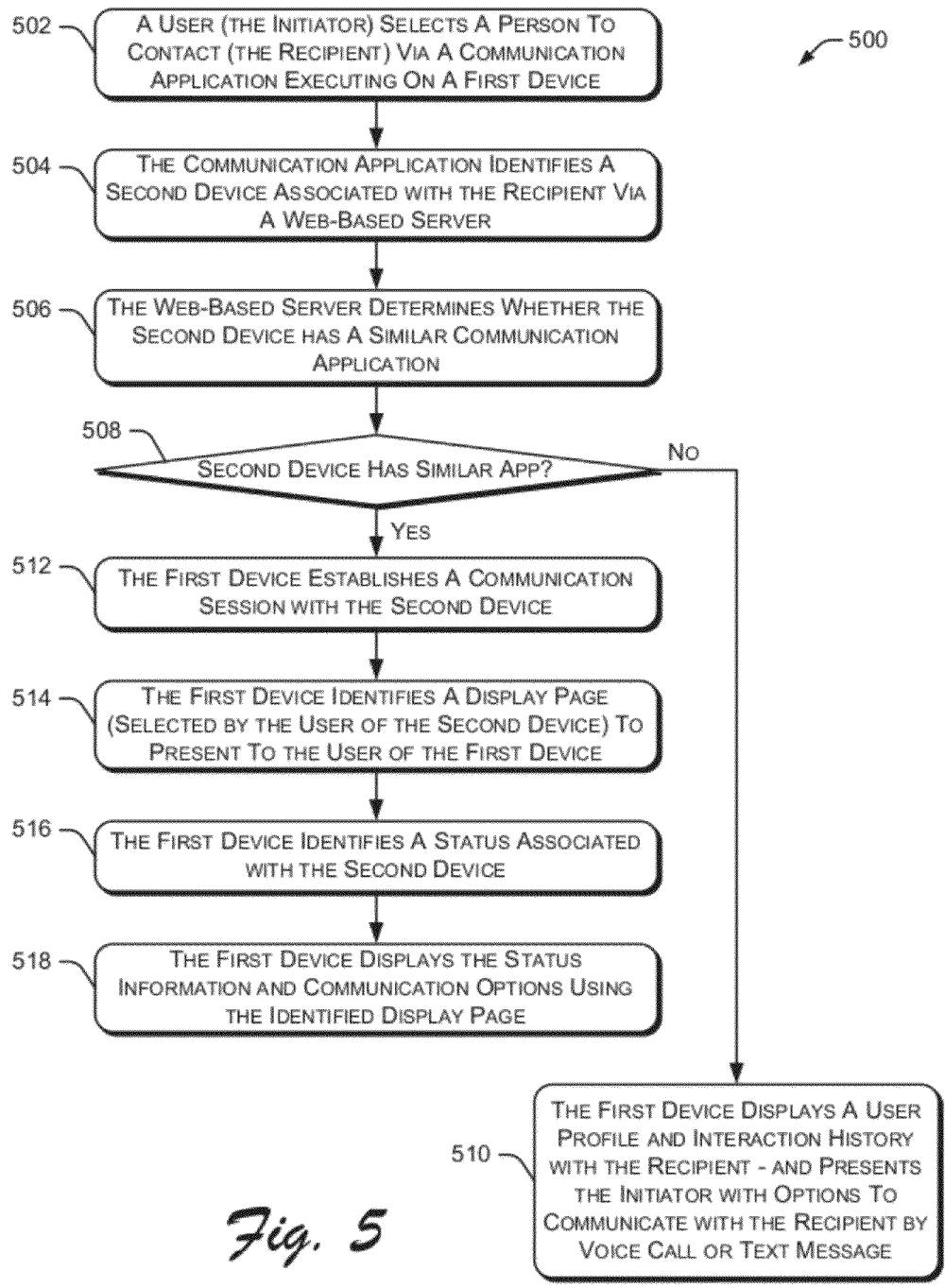
FIG. 5 is a flow diagram illustrating an embodiment of a procedure for initiating a communication session with another device.

FIG. 5 is a flow diagram illustrating an embodiment of a procedure 500 for initiating a communication session with another device. The procedure begins when a user (also referred to as "the initiator") selects a person to contact (also referred to as "the recipient") via a communication application executing on a first device (e.g., the initiator's device) at 502. The communication application identifies a second device associated with the recipient via a web-based server or other system at 504. The web-based server maintains information about other devices using similar communication applications. Thus, the web-based server is capable of determining whether the second device has a similar communication application at 506. In an alternate embodiment, the communication application first determines whether information associated with the second device is already cached on the first device. In this embodiment, the communication application may still retrieve updated recipient information from the web-based server, or the communication application may use the information cached on the first device.

If the second device does not have a similar communication application at 508, the first device displays a user profile and interaction history associated with the recipient at 510. The user profile may include a picture of the recipient, a geographic location associated with the recipient based on the recipient's phone number, and the like. Additionally, the first device presents the initiator with options to communicate with the recipient by voice call or text message, also at 510.

If the second device has a communication application that is similar to (or compatible with) the communication application on the first device at 508, the first device establishes a communication session with the second device at 512. The first device identifies a display page to present to the user of the first device at 514. This display page is selected by the user of the second device, thereby allowing the user of the second device to control what is displayed on the first device when the first and second devices are communicating in a communication session. The first device then identifies a status associated with the second device, such as busy, on another call, or available at 516. In a particular implementation, the status associated with the second device is determined before a communication session is established. The first device displays the status information and available communication options using the identified display page at 518. For example, if the status is "available", the communication options may include initiating a voice call, sending a text message, and the like.

Figure 6:
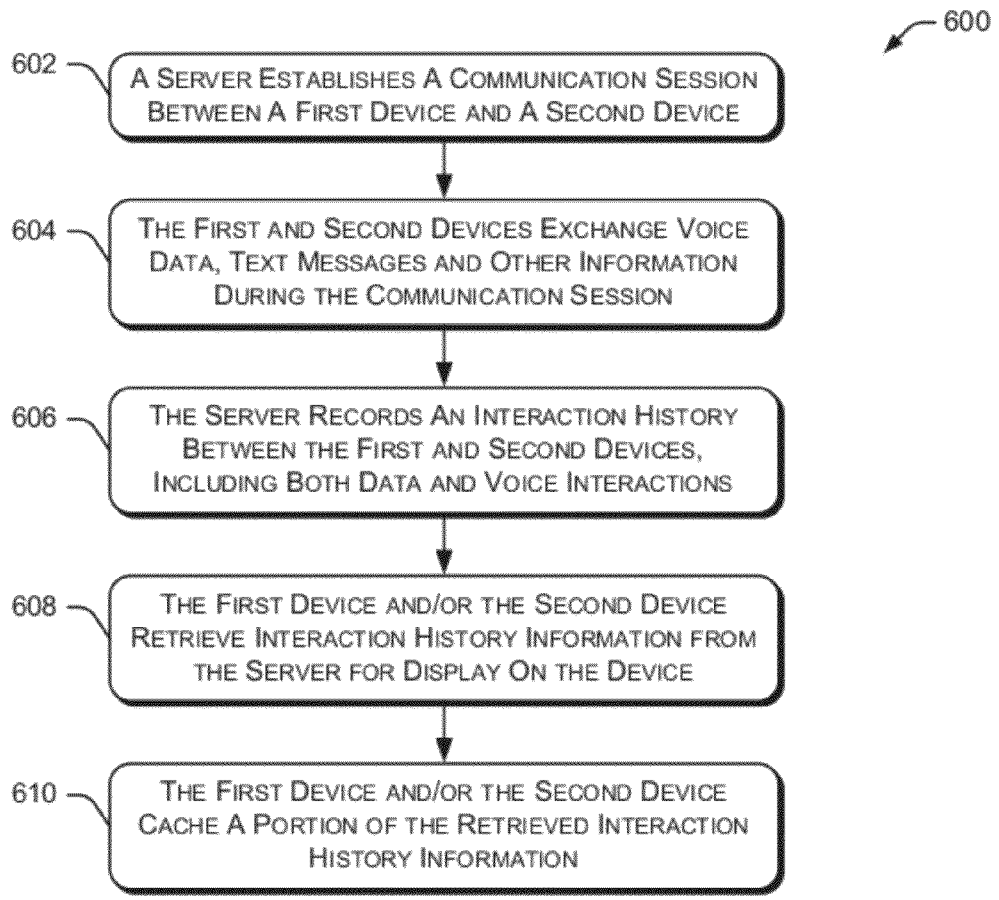
FIG. 6 is a flow diagram illustrating an embodiment of a procedure for maintaining an interaction history between users.

FIG. 6 is a flow diagram illustrating an embodiment of a procedure 600 for maintaining an interaction history between users. Initially, a server (e.g., a web-based server) establishes a communication session between a first device and a second device at 602. The first and second devices exchange voice data, text data and other information during the communication session at 604. The server records an interaction history between the two devices, including both data and voice interactions at 606. The interaction history may include an identification of the data communicated, the devices or users involved in the communication, date, time, and other information associated with the communication session.

At a later time, the first device and/or the second device may retrieve the interaction history from the server for display on the device at 608. For example, if a first user establishes a communication session with a second user, the communication application executing on the first user's device may retrieve interaction history for previous communication sessions with the same two users. This allows the first user to see previous communications with the second user and information about those communications. Additionally, the first device and/or the second device may cache all or a portion of the retrieved interaction history information for faster retrieval at a future time at 610. For example, a device may cache interaction history information associated with commonly called friends/contacts.

In particular embodiments, each interaction event is tagged with additional information, such as a contact identifier (e.g., name and/or phone number), start date/time, duration of communication session (if appropriate), and a current status. The communication application is capable of various types of interactions, such as:

Incoming and outgoing voice calls including voicemail messages with transcripts of the messages. Related information may include the day and time the message was sent or received, a caller ID associated with the caller, and the length of the voicemail message. The interaction status indicates whether a voicemail message was an incoming voicemail message or an outgoing voicemail message.

Incoming and outgoing text messages, such as SMS, MMS and IM messages. The interaction status indicates whether the text message was an incoming text message or an outgoing text message.

Sharing of contact information (such as v-cards), images, video content, audio content, music, location/maps, files, and screen capture images. The interaction status indicates whether the outgoing content was successfully received by the intended recipient.

Merchant transactions such as orders, purchases, reservations, and appointments. The interaction status will indicate whether the transaction has been received by the merchant, is pending with the merchant, or is confirmed by the merchant.

Offers such as coupons, daily specials, and special events. The interaction status will indicate whether the coupon is available, expired, or already used.

Surveys completed by a user. The interaction status will indicate whether the survey has been received. If a response to the survey is generated, the interaction status may also indicate the response.

Third party network history, such as social media entries/communications (e.g., Facebook® updates and Tweets on Twitter®), online reservation systems, online merchant reviews, online restaurant reviews, and so forth.

Figure 7:
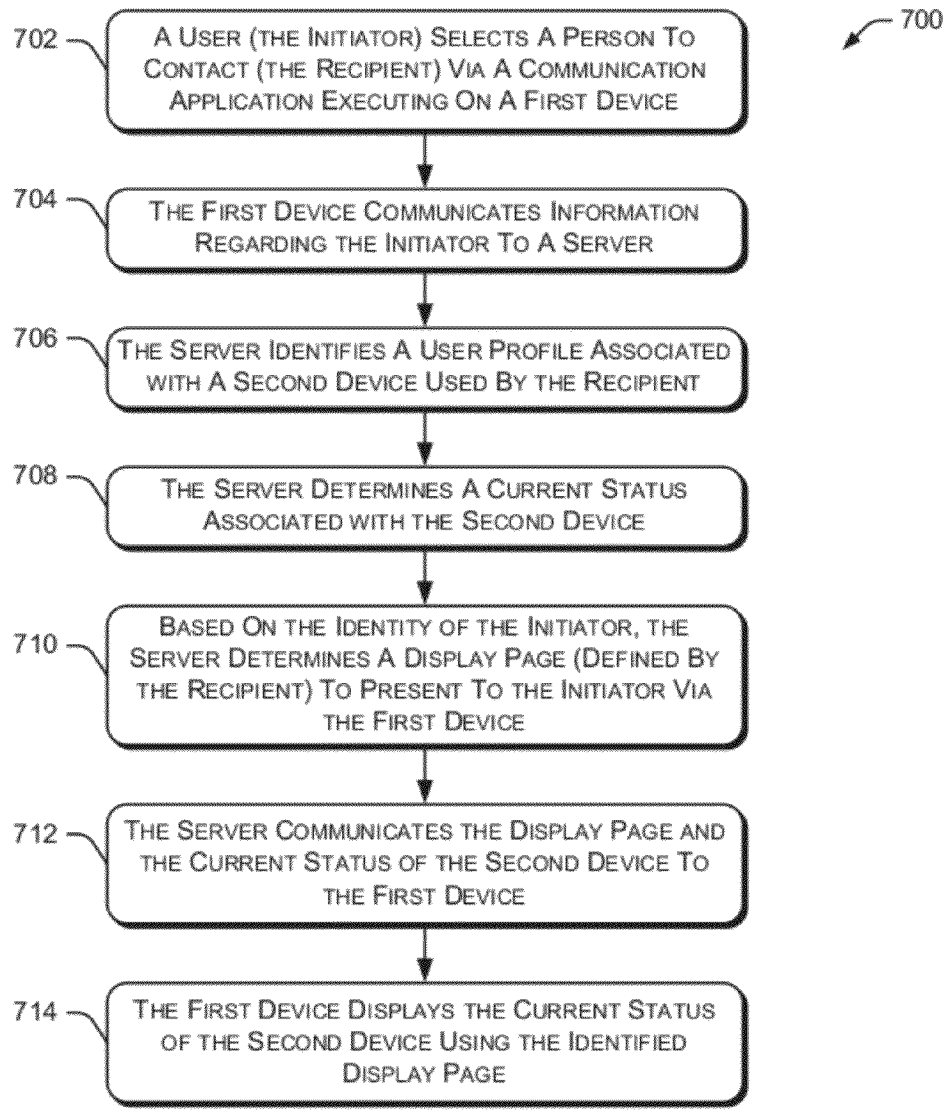
FIG. 7 is a flow diagram illustrating an embodiment of a procedure for establishing a communication session between two devices.

FIG. 7 is a flow diagram illustrating an embodiment of a procedure 700 for establishing a communication session between two devices. A user (the communication initiator) selects a person to contact (the communication recipient) via a communication application executing on a first device, such as a mobile device used by the communication initiator, at 702. The first device communicates information regarding the initiator to a server, such as a web-based server, at 704. The first device may communicate with the server using any communication medium and any communication protocol. For example, the first device may communicate with the server via a data communication network, a cellular communication network, and so forth. In a particular embodiment, the first device communicates information associated with the first device (e.g., phone number and user profile information) as well as information identifying the communication recipient and, if applicable, a message to communicate to the recipient.

Upon receipt of the information from the communication initiator, the server identifies a user profile associated with a second device used by the communication recipient at 706. The user profile may include a phone number, IP (Internet Protocol) address, or other unique identifier associated with the second device. The server then determines a current status associated with the second device at 708. In a particular implementation, the current status associated with the second device is determined before a communication session is established. In one embodiment, the server communicates a "push notification" to the second device with a "wake up" instruction. In this embodiment, the push notification may also include a message from the initiator. Based on the identity of the communication initiator, the server determines a display page to present to the initiator via the first device at 710. As discussed herein, the display page presented on the first device is defined (or selected) by the second user. Thus, the second user controls the particular display page (and corresponding information on that page) shown to the initiator on the first device.

The server communicates the selected display page and the current status of the second device to the first device at 712. In particular embodiments, the current status is contained within (or inserted into) the selected display page. Finally, the first device displays the current status of the second device using the identified display page at 714. As discussed herein, the first device may also display various options to the communication initiator, such as initiating a voice call, sending a text message, and the like.

Figure 8A:
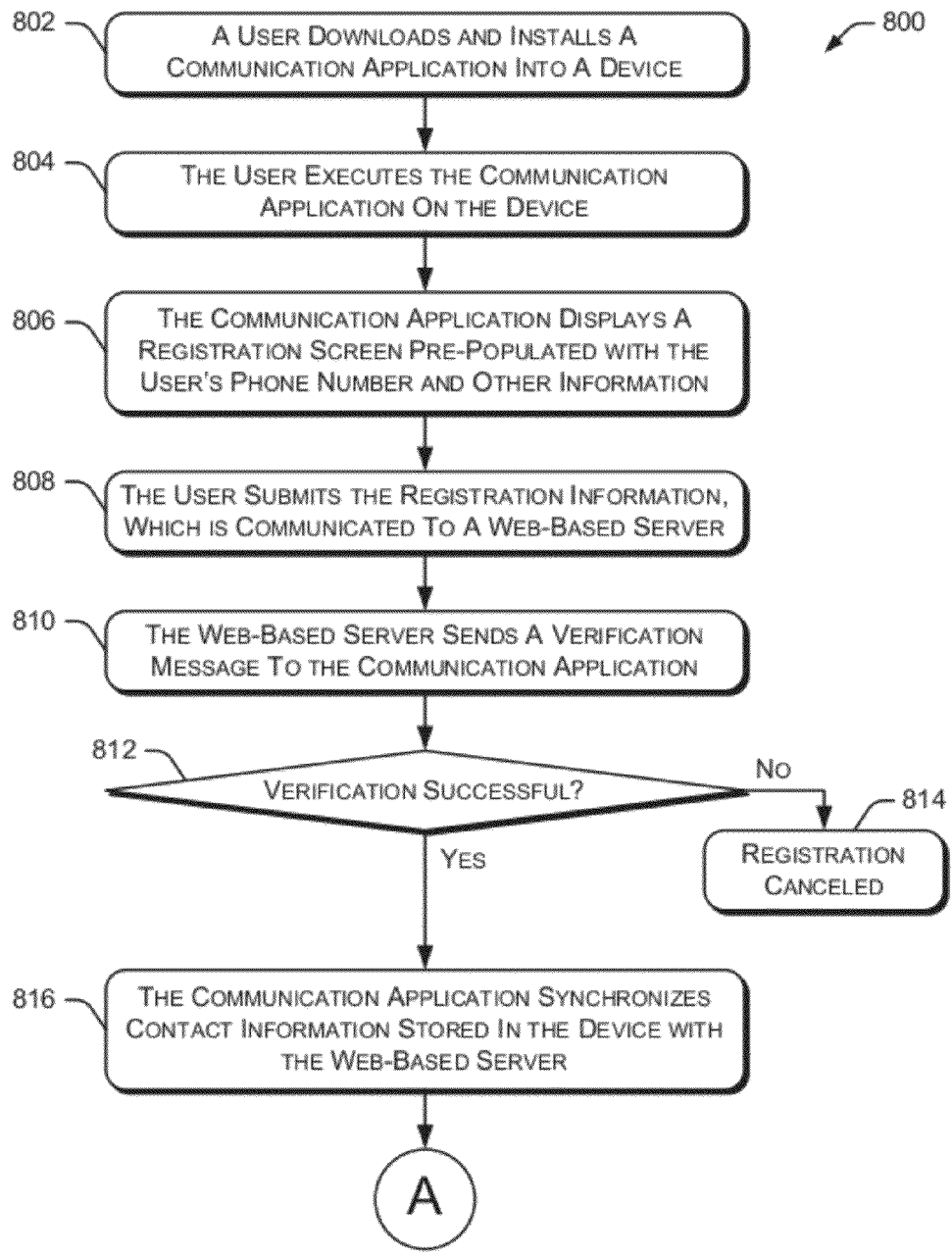
FIGS. 8A and 8B illustrate a flow diagram of an embodiment of a procedure for configuring a communication application.
Figure 8B:
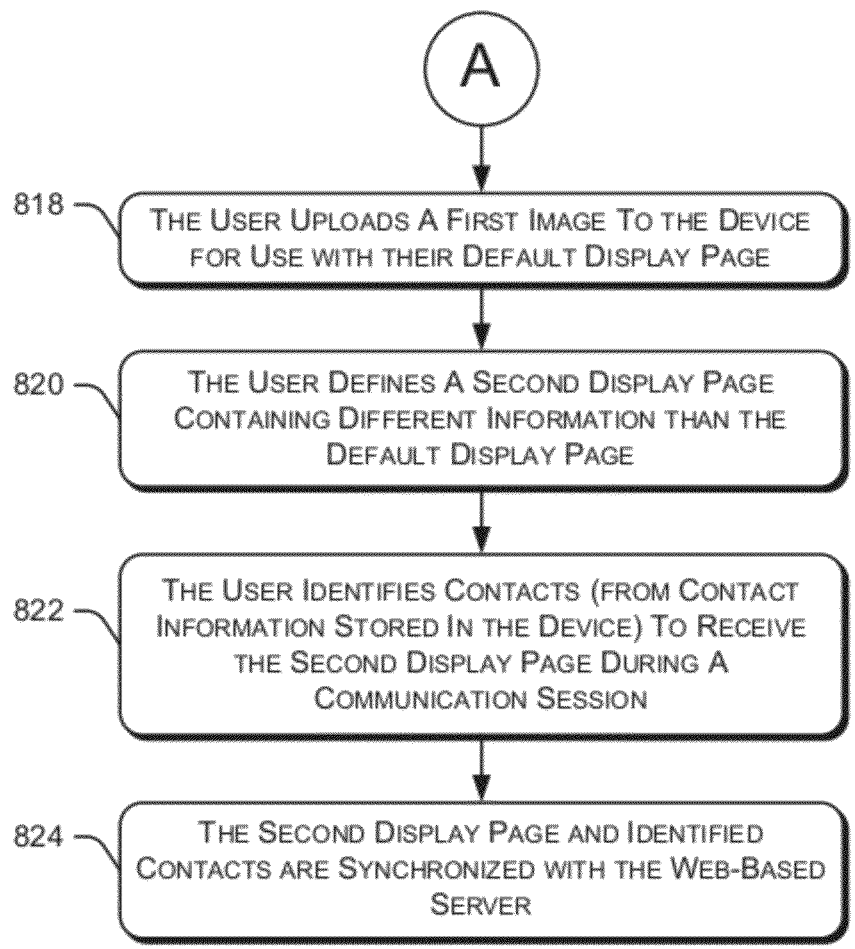

FIGS. 8A and 8B illustrate a flow diagram of an embodiment of a procedure 800 for configuring a communication application. Initially, a user downloads and installs a communication application into a device, such as a mobile device, at 802 of FIG. 8A. The user executes (e.g., launches) the communication application on the device at 804, causing the communication application to display a registration screen pre-populated with the user's phone number and other information, such as user name, geographic location, and the like, at 806. The user may enter additional information on the registration screen to supplement the pre-populated information.

After completing the registration information, the user submits the registration information at 808 by activating a "submit" button or similar element displayed on the device. The registration information is then communicated to a web-based server, also at 808. The server generates a verification message at 810 to ensure that the registration information was received from the identified device and not generated by a user or device "pretending" to be the identified device (e.g., an unauthorized user generating false registrations). If the verification is not successful at 812, the server discards the received registration information and cancels the registration of the device at 814. If the verification was successful at 812, the communication application synchronizes contact information stored in the device with the web-based server at 816.

The user continues configuration of the communication application by uploading a first image to the device for use with their default display page at 818 of FIG. 8B. The user also defines a second display page containing different information than the default display page at 820. The user identifies one or more contacts (e.g., from contact information already stored in the device) to receive the second display page during a communication session at 822. The second display page and its associated contacts are synchronized with the web-based server at 824. The user may also define additional display pages and associate other contacts with those display pages. Any contact not associated with a specific display page will be associated with the default display page.

In particular implementations, the user may also associate specific display pages with a user status or device status. For example, the user may identify a first display page to present when the user is available to communicate, but identifies a different display page for presentation when the user is busy or otherwise unavailable. Additionally, the user can associate specific display pages with different parameters, such as time of day, day of week, geographic location (e.g., at home, at work, or another location), and the like.

Particular embodiments allow a user to provide a variety of user profile information and other settings, such as user contact and personal information, and current status (e.g., driving, in a meeting, on a call, eating dinner, etc.)—this status information can be set manually or automatically (e.g., via the user's calendar or other application). Other user profile information includes payment information, contact associations, and so forth. Additionally, the user can define a custom audio ring-back tone that is played to the person who is calling the user. The user can define a default audio ring-back tone as well as one or more specific audio ring-back tones associated with specific contacts or contact groups. A user can also set a ringtone to be played on a contact's mobile device when the user calls that contact. This ringtone overrides the default ringtone set by the contact and may indicate an urgency or priority associated with the call (such as a siren sound for urgent calls).

Figure 9:
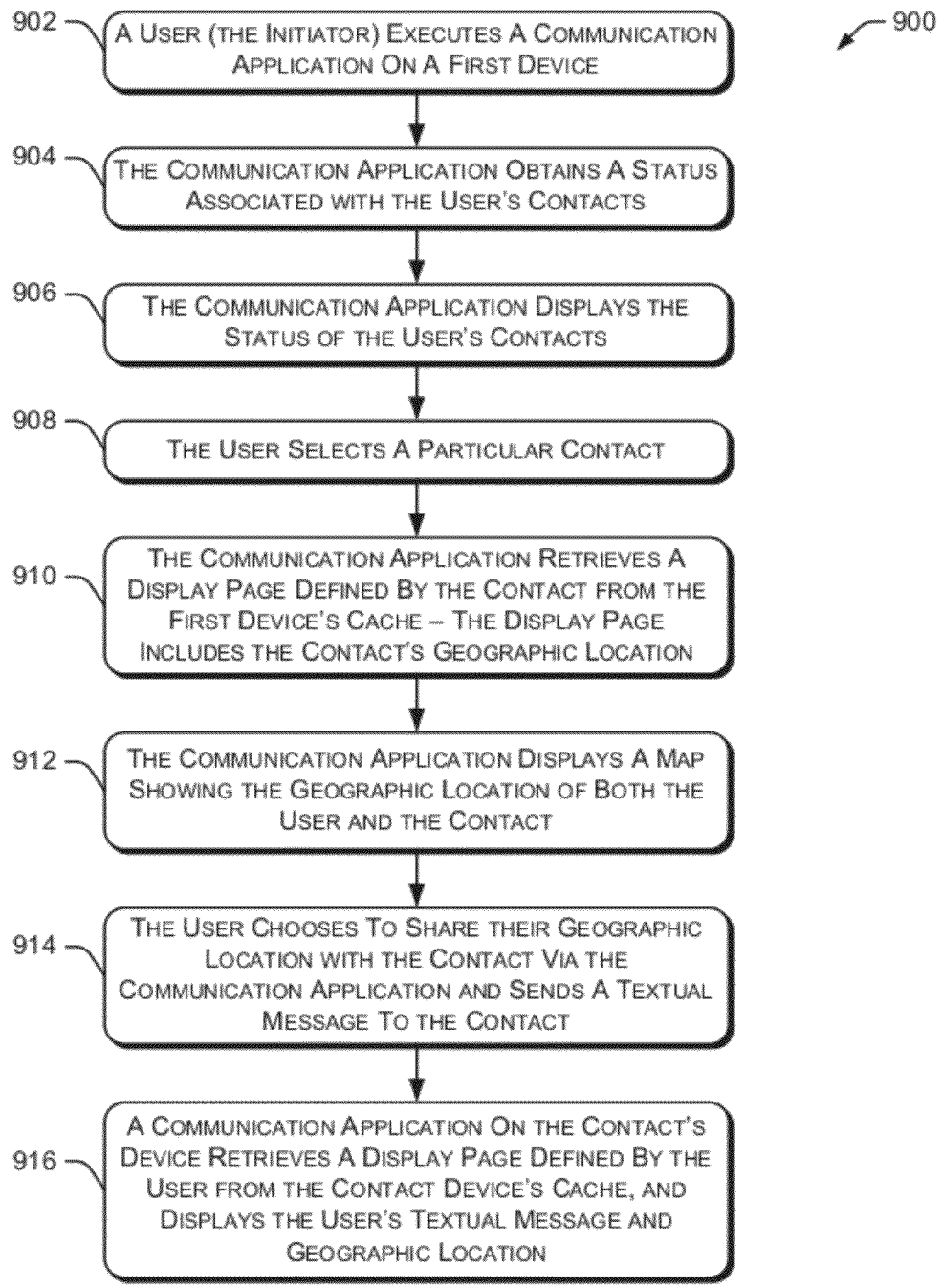
FIG. 9 is a flow diagram illustrating an embodiment of a procedure for initiating a communication session with another user.

FIG. 9 is a flow diagram illustrating an embodiment of a procedure 900 for initiating a communication session with another user. A user (the communication initiator) executes a communication application on a first device at 902. The communication application obtains a status associated with at least a portion of the user's contacts (e.g., from a web-based server discussed herein) at 904. The communication application displays the status of the user's contacts for which status information was obtained at 906. The user selects one of the contacts to initiate a communication session at 908. For the selected contact, the communication application retrieves (e.g., from a web-based server) a display page defined by the selected contact from the first device's cache at 910. Alternatively, the display page may be retrieved from a web-based server or other data source.

In a particular embodiment, the display page includes the contact's geographic location, which may be displayed on a map or presented textually (e.g., I'm at the coffee shop at 5th and Maple). In one implementation, the communication application displays on the first device a map showing the geographic location of both the user and the selected contact at 912. Additionally, the map may show a driving route, distance, and travel time between the user and the selected contact. The user may choose to share their geographic location with the contact via the communication application at 914. If the user chooses to share their location, the communication application communicates the user's geographic location (determined, for example, by a GPS contained in the first device) to the contact's device. Additionally, the user may send a text message or other information to the contact's device for display to the contact. A communication application on the contact's device retrieves a display page defined by the user from the contact device's cache (or from the web-based server) at 916. The communication application on the contact's device then displays the user's text message as well as a map showing the geographic location of both the user and the contact.

Figure 10:
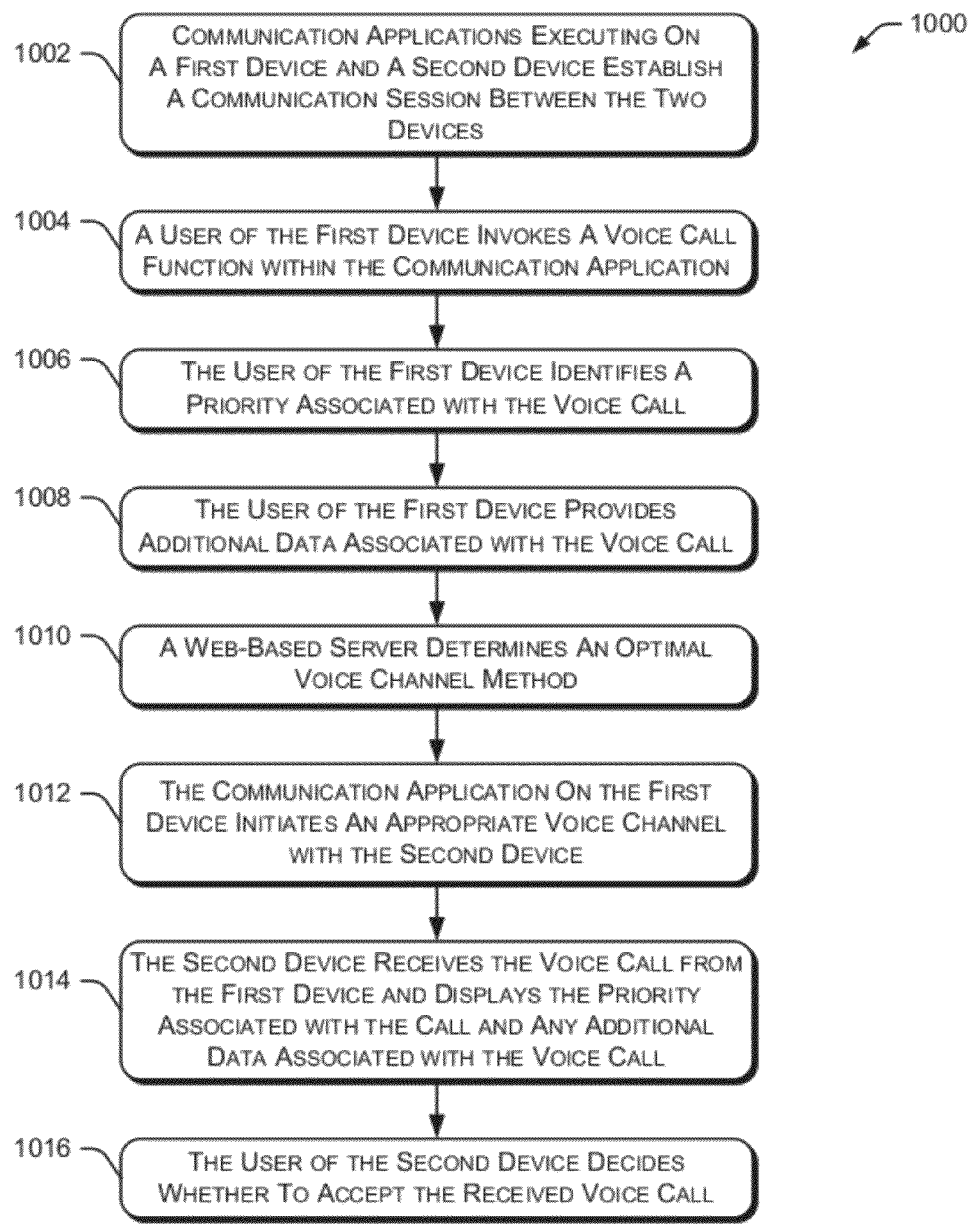
FIG. 10 is a flow diagram illustrating an embodiment of a procedure for prioritizing voice calls and associating additional information with a voice call.

FIG. 10 is a flow diagram illustrating an embodiment of a procedure 1000 for prioritizing voice calls and associating additional information with a voice call. Communication applications executing on a first device and a second device establish a communication session between the two devices at 1002. In a particular embodiment, the communication session is established and maintained with the support of a web-based server or similar system coupled to both devices. A user of the first device initiates a voice call function within the communication application at 1004. The user of the first device identifies a priority associated with the voice call at 1006, such as a high priority (or an urgent priority). The user of the first device may also provide additional information associated with the call at 1008, such as the reason for the call or the reason for the priority associated with the call.

The web-based server (or other system) determines at 1010 an optimal voice channel method; i.e., the best communication method for establishing a voice-based communication link between the two devices. The communication application on the first device initiates an appropriate voice channel (based on the server's determination) between the first device and the second device at 1012. The second device receives the voice call (or voice channel setup request) from the first device and displays the priority associated with the voice call as well as any additional data associated with the voice call at 1014. The user of the second device then decides whether to accept the received voice call at 1016. The priority associated with the voice call can be represented in a variety of ways, such as a text notice "Urgent Call", a red "Accept Urgent Call" button, a flashing "Accept Call" button, an audible sound indicating a priority call, and the like. In particular implementations, different color codes are used to visually indicate a call priority, such as red for urgent calls, yellow for important calls, and green for normal calls.

Figure 11:
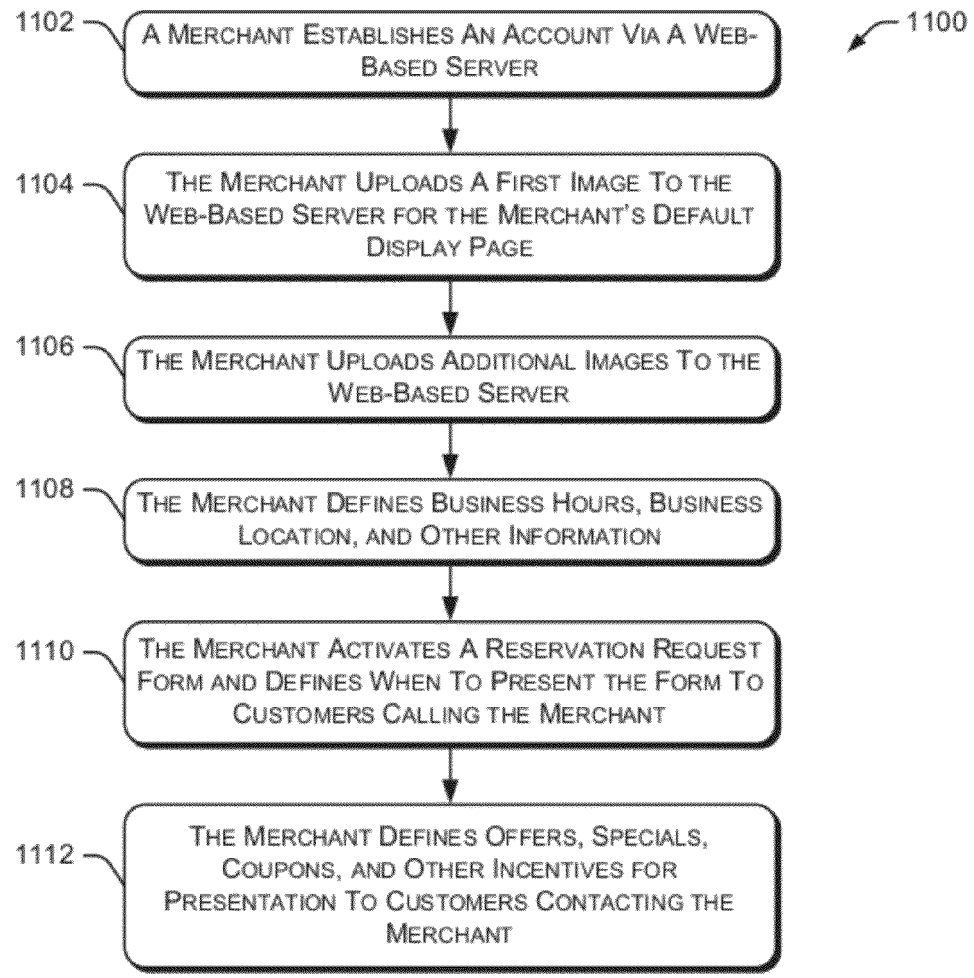
FIG. 11 is a flow diagram illustrating an embodiment of a procedure for configuring a merchant communication account.

FIG. 11 is a flow diagram illustrating an embodiment of a procedure 1100 for configuring a merchant communication account. Initially, a merchant establishes an account via a web-based server or other system at 1102. Establishing the account includes, for example, defining a profile associated with the merchant's business, uploading photos related to the merchant's business (e.g., store photo, pictures of products/services, and a map showing the location of the business), defining special offers/coupons, and defining forms used to collect information from customers. In particular, the merchant uploads a first image to the web-based server for use in the merchant's default display page at 1104. The merchant also uploads additional images to the web-based server for use in other display pages or to provide more images for a customer to scroll through on the default display page at 1106.

The merchant also defines business hours, business location (including driving directions), and other information that may be of value to a customer at 1108. In a particular embodiment, the merchant is a restaurant or other business that accepts reservations from customers. In this embodiment, the merchant activates a reservation request form and defines when to present that form to customers calling or otherwise communicating with the merchant at 1110. Additionally, the merchant can define customer offers, daily specials, coupons, and other incentives for presentation to customers contacting the merchant at 1112.

Additionally, a merchant may define other forms that automate the interaction process with the merchant's customers (and potential customers). Example forms include delivery requests, a product/service order form, an offsite service request, and the like. These forms may capture the customer's name, phone number, address, email address, payment information, and other information automatically and pre-fill those portions of the form, thereby simplifying the form-filling procedure for the customer.

Figure 12:
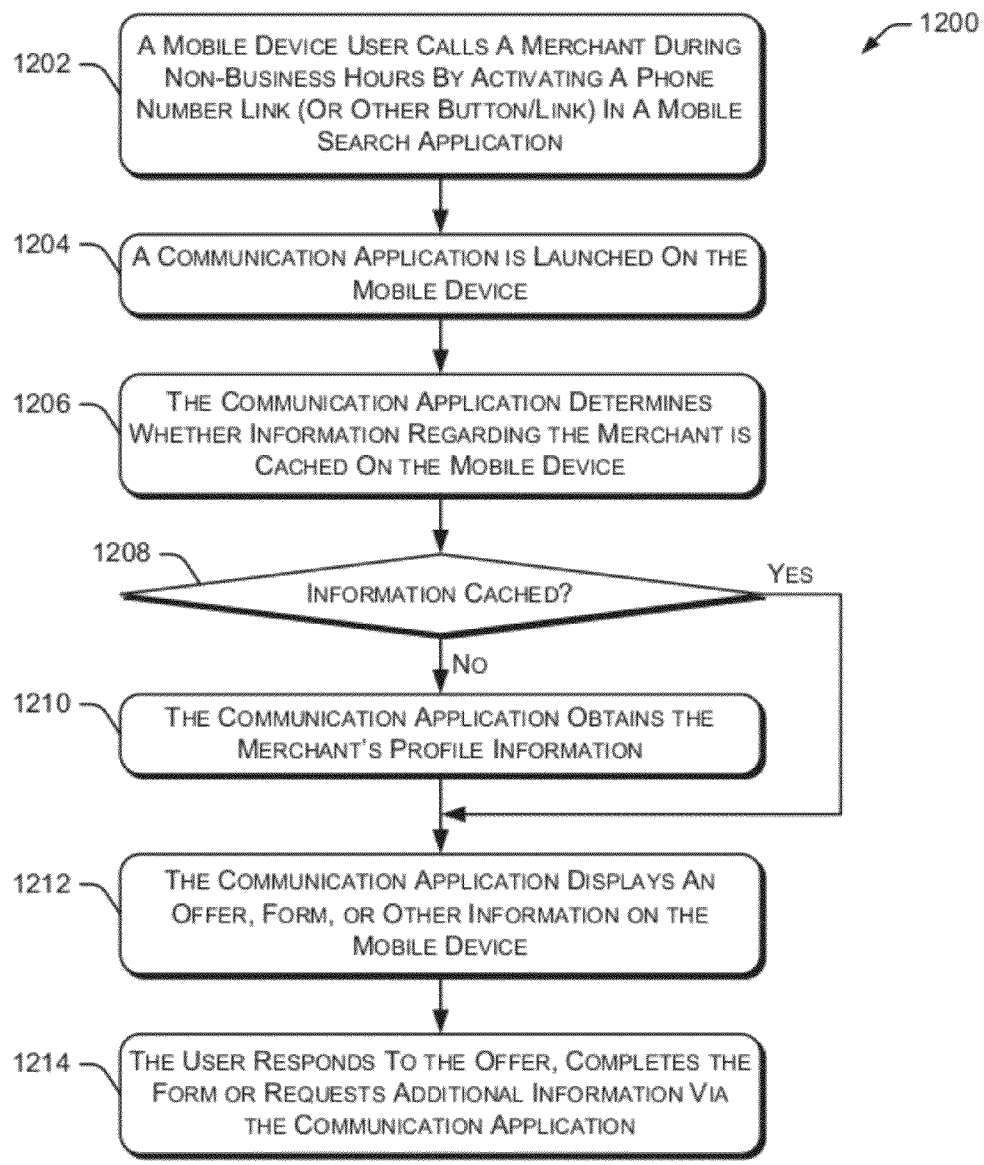
FIG. 12 is a flow diagram illustrating an embodiment of a procedure for handling merchant calls during non-business hours.

FIG. 12 is a flow diagram illustrating an embodiment of a procedure 1200 for handling merchant calls during non-business hours. In this example procedure, a mobile device user calls a merchant during non-business hours by activating a phone number link (or other button/link) in a mobile search application, such as a web browser application, at 1202. Upon activation of the phone number link, a communication application is launched on the mobile device at 1204. The communication application determines whether information regarding the merchant is cached on the mobile device at 1206. If the information is not cached at 1208, the communication application obtains the merchant's profile information from a web-based server or other system at 1210.

The communication application displays an offer, form or other information associated with the merchant (e.g., the information obtained from the cache or from the web-based server) on the mobile device at 1212. The user responds to the offer, completes the form or requests additional information via the communication application at 1214. In a particular embodiment, the displayed information includes a reservation request form that allows the mobile device user to request a dining reservation at a particular day and time, and for a particular number of people. At a later time, the merchant can quickly respond to multiple reservation requests using the merchant's communication application. Thus, rather than attempting to call each customer who submitted a reservation request, the merchant can respond by clicking a "confirm reservation" button or similar button/link in the communication application. The customer then receives a text message in their own communication application confirming the reservation. The customer's communication application may include a reservation status indicator (e.g., reservation request sent to merchant, reservation request received by merchant, and reservation confirmed). The reservation status indicator may be displayed as a visual indicator/icon, as a textual entry, or any other graphical or audio indicator. When a reservation request is confirmed, a status indicator associated with the reservation request shown in the interaction history is changed to "reservation confirmed". Additionally, a new entry may be inserted into the interaction history indicating the confirmation of the reservation. An example reservation request form and confirmation response from the merchant are shown in FIGS. 14A-14B.

Figure 13:
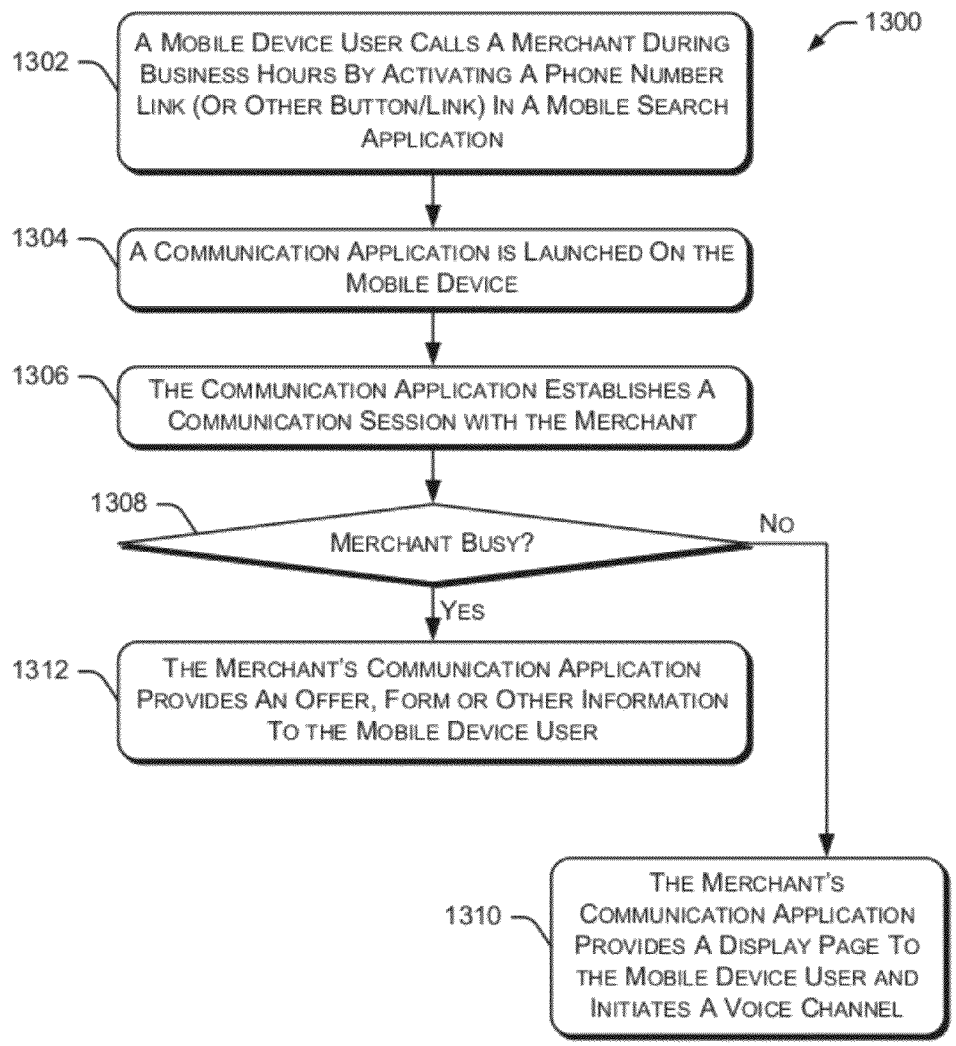
FIG. 13 is a flow diagram illustrating an embodiment of a procedure for handling merchant calls during business hours.

FIG. 13 is a flow diagram illustrating an embodiment of a procedure 1300 for handling merchant calls during business hours. A mobile device user calls a merchant during business hours by activating a phone number link (or other button/link) in a mobile search application at 1302. A communication application is then launched on the mobile device at 1304. The communication application establishes a communication session between the user and the merchant at 1306. If the merchant is busy at 1308, the merchant's communication application provides an offer, form or other information to the mobile device user at 1312. Additionally, the user may receive an indication that the merchant is unable to currently answer the user's call. If, when the user initiates the call, the merchant is not busy at 1308, the merchant's communication application provides a display page to the mobile device user and initiates a voice channel between the merchant and the user at 1310.

When a customer interacts with a merchant, the communication application automatically detects that the communication recipient is a merchant and tags that contact as a "merchant contact" in the customer's contact list. This allows the user to have their own "merchant contact list", which can be viewed separately from the user's personal contacts. The user's communication application maintains the interaction history with each merchant, including past orders, past reservations, and so forth. This interaction history allows a user to easily locate and repeat previous orders or purchases.

Figure 14A:
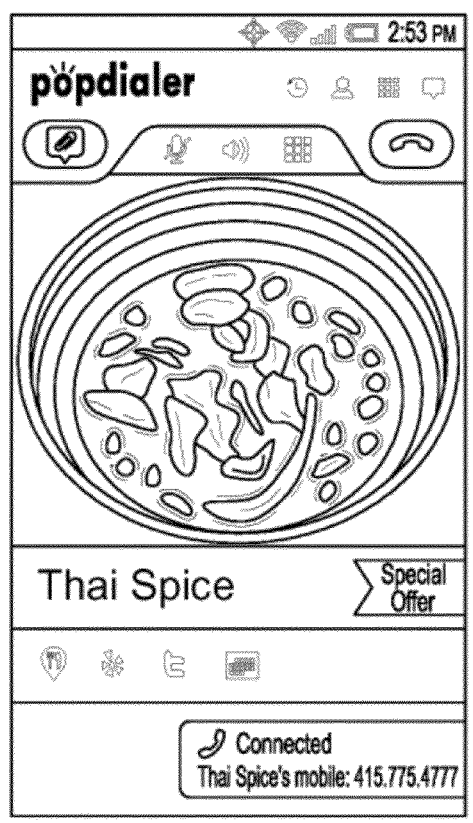
FIGS. 14A-14D illustrate example screen displays generated during a particular communication session between a customer and a merchant.
Figure 14B:

FIGS. 14A-14D illustrate example screen displays generated during a particular communication session between a customer and a merchant. FIG. 14A shows an initial merchant display page after the customer has selected the merchant from a contact list or activated a link/button in a mobile search application. This display page shows a default image as well as a "special offer" button. In alternate embodiments, the display page includes a scroll function that allows a customer to navigate through multiple images. The images can be arranged in any manner such that the user scrolls vertically, horizontally, or in any other orientation. In particular implementations, the multiple images are arranged in a manner that simulates a rotating carousel of images. In this restaurant example, the additional images may include pictures of the restaurant, pictures of favorite menu items, a picture of the menu, and so forth.

Figure 14C:
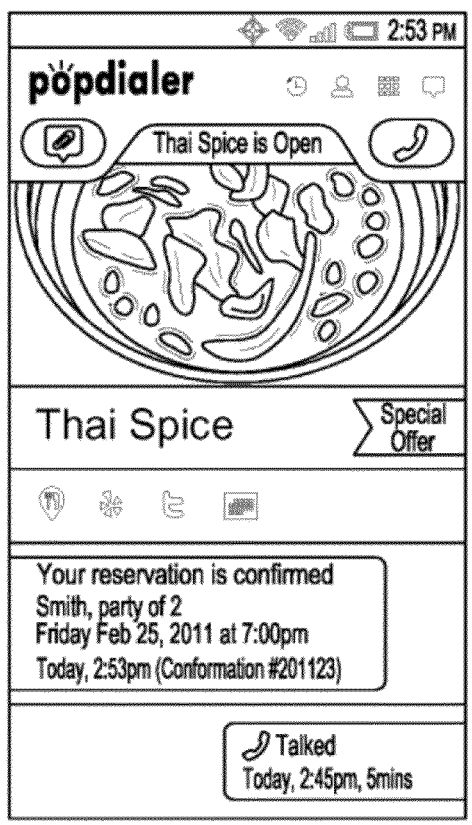
Figure 14D:

FIG. 14B shows a reservation form that allows the customer to request a reservation at the restaurant. FIG. 14C shows the merchant display page after the customer's reservation request has been confirmed. The reservation confirmation is shown as an entry in the interaction history displayed in the bottom portion of the display page. FIG. 14D shows an updated merchant display page after the customer has received a coupon from the merchant. The interaction history is updated to include the recently received coupon.

Figure 15:
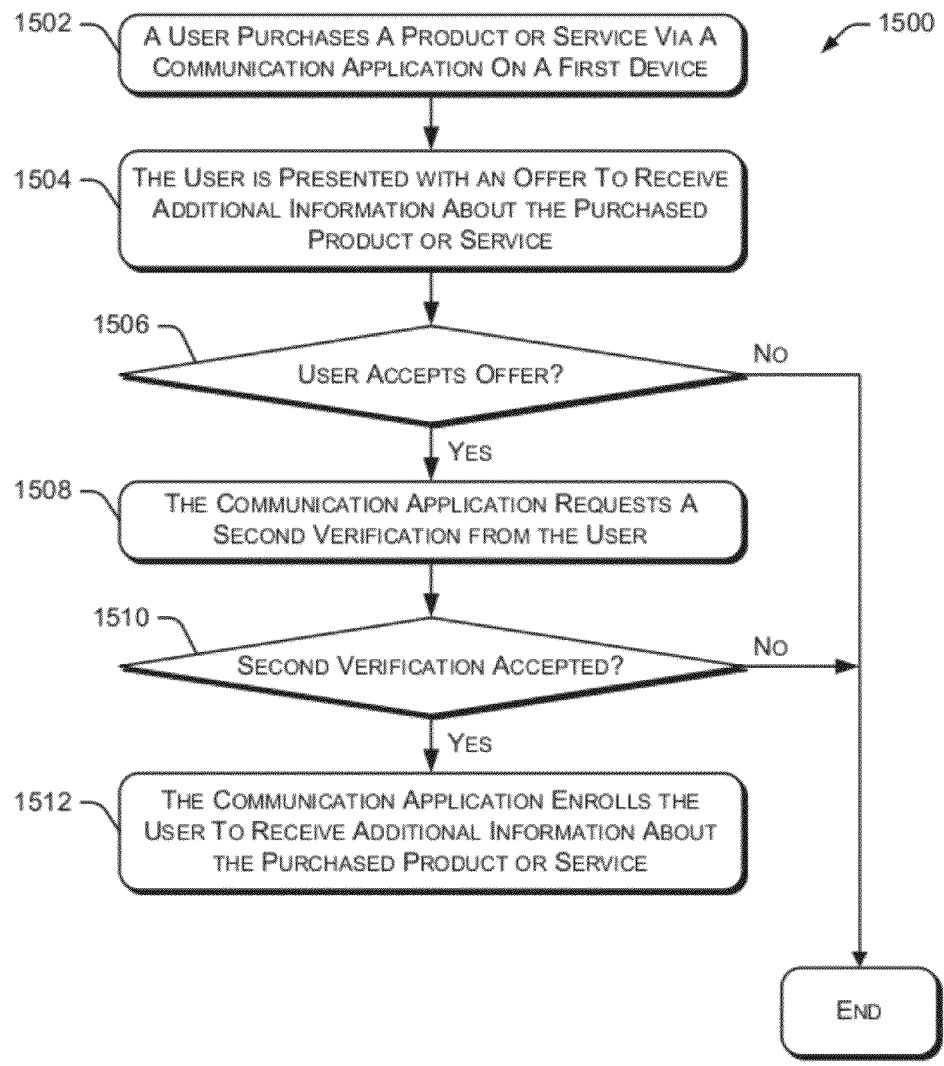
FIG. 15 is a flow diagram illustrating an embodiment of a procedure for mobile purchasing and service enrollment.

FIG. 15 is a flow diagram illustrating an embodiment of a procedure 1500 for mobile purchasing and service enrollment. Initially, a user purchases a product or service through the communication application on a first device (e.g., the user's mobile device) at 1502. The purchase may be the result of an advertisement displayed on the first device or as a result of a contact initiated by the user with the merchant. The user is presented with an offer to receive additional information about the purchased product or service at 1504. This additional information includes future product updates, product operating tips, recall notices, periodic newsletter, and additional products or services that complement the originally purchased product or service. If the user accepts the offer at 1506, the communication application on the first device requests a second verification from the user at 1508, which may be referred to as "double verification". For example, the communication application may display instructions requesting the user to touch a specific button or a sequence of buttons displayed on the first device. Alternatively, the communication application may ask the user to speak a phrase that is displayed on the first device. In this implementation, the spoken phrase is recorded and stored in the first device and/or communicated to a server for storage.

If the second verification is provided by the user and accepted by the communication application at 1510, the user is enrolled to receive additional information about the purchased product or service at 1512. If the user does not provide the requested second verification, or provides incorrect verification (e.g., does not press the proper buttons in the requested sequence), the user is not enrolled to receive additional information.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:

1. A method comprising:
   initiating a communication session between a first device and a second device via a server;
   identifying a first user associated with the first device;
   identifying a second user associated with the second device;
   accessing, using one or more processors, a profile page to present on the first device when the communication session is initiated by the second device, the profile page comprising name information, contact information, and profile information, the profile page selected by the second user such that the second user controls the profile page displayed on the first device when the first and second devices are communicating in the communication session;
   accessing, using one or more processors, an interaction history between the first user and the second user from the server; and
   communicating the interaction history to the first device for display on the first device with the profile page of the second user, the profile page and the interaction history displayed on the first device after the second device initiates the communication session and before the first user engages in the communication session.

2. The method of claim 1, further comprising communicating the interaction history to the second device for display on the second device.

3. The method of claim 1, the interaction history including text messages and voice calls between the first user and the second user.

4. The method of claim 1, the interaction history including at least one of outbound voicemail messages, outbound voicemail transcriptions, outbound voicemail date, outbound voicemail time, outbound voicemail caller identification, or outbound voicemail message length, or any combination thereof.

5. The method of claim 1, the interaction history including at least one of inbound voicemail messages, inbound voicemail transcriptions, inbound voicemail date, inbound voicemail time, inbound voicemail caller identification, or inbound voicemail message length, or any combination thereof.

6. The method of claim 1, the interaction history including an exchange of at least one of contact information, pictures, videos, music, geographic location data, data files, or screen capture images, or any combination thereof.

7. The method of claim 1, the interaction history identifying: a plurality of interaction events between the first user and the second user; and a time associated with each of the plurality of interaction events.

8. The method of claim 1, the interaction history including interactions with third party networks.

9. The method of claim 1, the interaction history including interactions with social media networks.

10. A system configured to:
    initiate a communication session between a first device and a second device via a server;
    identify a first user associated with the first device;
    identify a second user associated with the second device;
    access, using one or more processors, a profile page to present on the first device when the communication session is initiated by the second device, the profile page comprising name information, contact information, and profile information, the profile page selected by the second user such that the second user controls the profile page displayed on the first device when the first and second devices are communicating in the communication session;

access, using one or more processors, an interaction history between the first user and the second user from the server; and communicate the interaction history to the first device for display on the first device with the profile page of the second user, the profile page and the interaction history displayed on the first device after the second device initiates the communication session and before the first user engages in the communication session.

11. The system of claim 10, further configured to communicate the interaction history to the second device for display on the second device.

12. The system of claim 10, wherein the interaction history includes text messages and voice calls between the first user and the second user.

13. The system of claim 10, wherein the interaction history includes at least one of outbound voicemail messages, outbound voicemail transcriptions, outbound voicemail date, outbound voicemail time, outbound voicemail caller identification, or outbound voicemail message length, or any combination thereof.

14. The system of claim 10, wherein the interaction history includes at least one of inbound voicemail messages, inbound voicemail transcriptions, inbound voicemail date, inbound voicemail time, inbound voicemail caller identification, or inbound voicemail message length, or any combination thereof.

15. The system of claim 10, wherein the interaction history includes an exchange of at least one of contact information, pictures, videos, music, geographic location data, data files, or screen capture images, or any combination thereof.

16. The system of claim 10, wherein the interaction history identifies: a plurality of interaction events between the first user and the second user; and a time associated with each of the plurality of interaction events.

17. The system of claim 10, wherein the interaction history includes interactions with third party networks.

18. The system of claim 10, wherein the interaction history includes interactions with social media networks.

* * * * *